United States Patent
Tang et al.

(10) Patent No.: US 7,675,313 B1
(45) Date of Patent: Mar. 9, 2010

(54) METHODS AND SYSTEMS FOR STORING A SECURITY KEY USING PROGRAMMABLE FUSES

(75) Inventors: Howard Tang, San Jose, CA (US); Ju Shen, San Jose, CA (US); San-Ta Kow, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 267 days.

(21) Appl. No.: 11/498,645

(22) Filed: Aug. 3, 2006

(51) Int. Cl.
*H03K 19/00* (2006.01)
(52) U.S. Cl. .............................. 326/8; 716/16; 713/189; 713/193; 326/38
(58) Field of Classification Search ................. 326/8–9, 326/37–47; 713/189–193, 1, 135, 180; 716/16; 711/100, 102, 152, 153, 216
See application file for complete search history.

(56) References Cited

U.S. PATENT DOCUMENTS

| | | | | |
|---|---|---|---|---|
| 5,838,167 | A * | 11/1998 | Erickson et al. | 326/38 |
| 6,118,869 | A * | 9/2000 | Kelem et al. | 380/44 |
| 6,212,639 | B1 * | 4/2001 | Erickson et al. | 726/26 |
| 6,654,889 | B1 * | 11/2003 | Trimberger | 713/191 |
| 6,876,594 | B2 * | 4/2005 | Griesmer et al. | 365/225.7 |
| 6,944,083 | B2 * | 9/2005 | Pedlow, Jr. | 365/225.7 |
| 7,284,134 | B2 * | 10/2007 | Fujiwara et al. | 713/189 |
| 7,339,400 | B1 * | 3/2008 | Walstrum et al. | 326/41 |
| 2002/0199110 | A1 * | 12/2002 | Kean | 713/189 |

OTHER PUBLICATIONS

Altera®, Chapter 7, Configuring Stratis II Devices, Jul. 2004, pp. 7-1-7-94.

* cited by examiner

*Primary Examiner*—James H. Cho
*Assistant Examiner*—Christopher Lo
(74) *Attorney, Agent, or Firm*—Haynes and Boone, LLP (57) ABSTRACT

Systems and methods are disclosed herein to provide improved security key techniques for programmable logic devices. For example, in accordance with an embodiment of the present invention, a method of providing data security for a programmable logic device (PLD) includes programming a plurality of programmable fuses that stores a security key comprising a plurality of data bit values, wherein each data bit value is associated with a respective subset of at least three of the fuses. The security key is retrieved from the fuses using the data bit values stored by each subset of the fuses. An encrypted configuration data bitstream is decrypted using the retrieved security key to obtain an original configuration data bitstream to configure the PLD.

13 Claims, 6 Drawing Sheets

METHODS AND SYSTEMS FOR STORING A SECURITY KEY USING PROGRAMMABLE FUSES

TECHNICAL FIELD

The present invention relates generally to electrical circuits and, more particularly, to the security of programmable logic devices.

BACKGROUND

Programmable logic devices (PLDs), such as field programmable gate arrays (FPGAs) or complex programmable logic devices (CPLDs), may be programmed with configuration data to provide various user-defined features. For example, configuration data may be loaded from an external non-volatile memory, such as a flash memory, into volatile configuration memory of the PLD.

The particular configuration data bitstream loaded into the PLD may be proprietary in nature, and as a result, it is desirable for developers to maintain its secrecy. Because many conventional non-volatile memories permit configuration data bitstreams to be read by external devices, developers may choose to encrypt configuration data bitstreams before they are stored in external non-volatile memory and loaded into the PLD.

Configuration data is often encrypted and decrypted through the use of conventional security keys. For example, a configuration data bitstream may be encrypted using a particular security key and then stored in an external non-volatile memory in encrypted form. The encrypted configuration data bitstream may be loaded into the PLD from the external non-volatile memory and decrypted by the PLD using the appropriate security key stored onboard the PLD. The decrypted configuration data may then be loaded into volatile configuration memory of the PLD. In such applications, the security of the configuration data largely depends on maintaining the secrecy of the security key and the manner in which the security key is stored onboard the PLD.

However, existing approaches to onboard security key storage in PLDs is generally problematic. For example, in certain implementations, the security key may be stored in volatile SRAM cells onboard the PLD which are maintained by a battery. Nevertheless, the security key will be lost if there is a disruption in the power supplied to the SRAM cells as a result of, for example, a battery failure.

In other implementations, the security key may be stored in non-volatile memory onboard the PLD. Unfortunately, if such non-volatile memory exhibits a manufacturing defect, individual data bit values of the security key may be incorrectly stored. As a result, an erroneous security key may be used by the PLD, thereby preventing the PLD from properly decrypting incoming configuration data bitstreams.

Accordingly, there is a need for an improved approach to maintaining the secrecy of security keys stored in non-volatile memory. In addition, there is a need for an improved approach to the programming of security keys that reduces the likelihood of incorrect data bit values of the security key being stored in non-volatile memory.

SUMMARY

In accordance with one embodiment of the present invention, a method of providing data security for a programmable logic device (PLD) includes providing a plurality of programmable fuses that stores a security key comprising a plurality of data bit values, wherein each data bit value is associated with a respective subset of at least three of the fuses; retrieving the security key from the fuses using the data bit values stored by each subset of the fuses; and decrypting an encrypted configuration data bitstream using the retrieved security key to obtain an original configuration data bitstream to configure the PLD.

In accordance with another embodiment of the present invention, a programmable logic device (PLD) includes volatile configuration memory adapted to be programmed with configuration data to determine user-defined features of the PLD; a plurality of programmable fuses; a circuit adapted to program the fuses with a security key comprising a plurality of data bit values, wherein each data bit value is associated with a respective subset of at least three of the fuses; a plurality of decoders adapted to retrieve the security key from the fuses using the data bit values stored by each subset of the fuses, wherein each decoder is associated with one of the subsets of the fuses; and a decryption engine adapted to decrypt an encrypted configuration data bitstream using the retrieved security key.

In accordance with another embodiment of the present invention, a system includes a first programmable logic device (PLD) comprising: volatile configuration memory adapted to be programmed with configuration data to determine user-defined features of the first PLD; a first plurality of programmable fuses that stores a first security key comprising a plurality of data bit values, wherein each data bit value of the first security key is associated with a respective subset of at least three of the first fuses; means for programming the first fuses with the first security key; means for retrieving the first security key from the first fuses using the data bit values stored by each subset of the first fuses; and means for decrypting a first encrypted configuration data bitstream using the retrieved first security key to obtain a first original configuration data bitstream adapted to be programmed into the volatile configuration memory of the first PLD.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Embodiments of the present invention and their advantages are best understood by referring to the detailed description that follows. It should be appreciated that like reference numerals are used to identify like elements illustrated in one or more of the figures.

The various techniques disclosed herein are applicable to a wide variety of integrated circuits and applications. As an exemplary implementation, a programmable logic device having one-time-programmable (OTP) fuses will be utilized to illustrate the techniques in accordance with one or more embodiments of the present invention. However, it should be understood that this is not limiting and that the techniques disclosed herein may be implemented as desired, in accordance with one or more embodiments of the present invention, within various types of integrated circuits and fuses. Therefore, the techniques may be applied to integrated circuits other than PLDs and fuses other than OTP fuses, such as fuses implemented in flash or other non-volatile memory.

Figure 1:
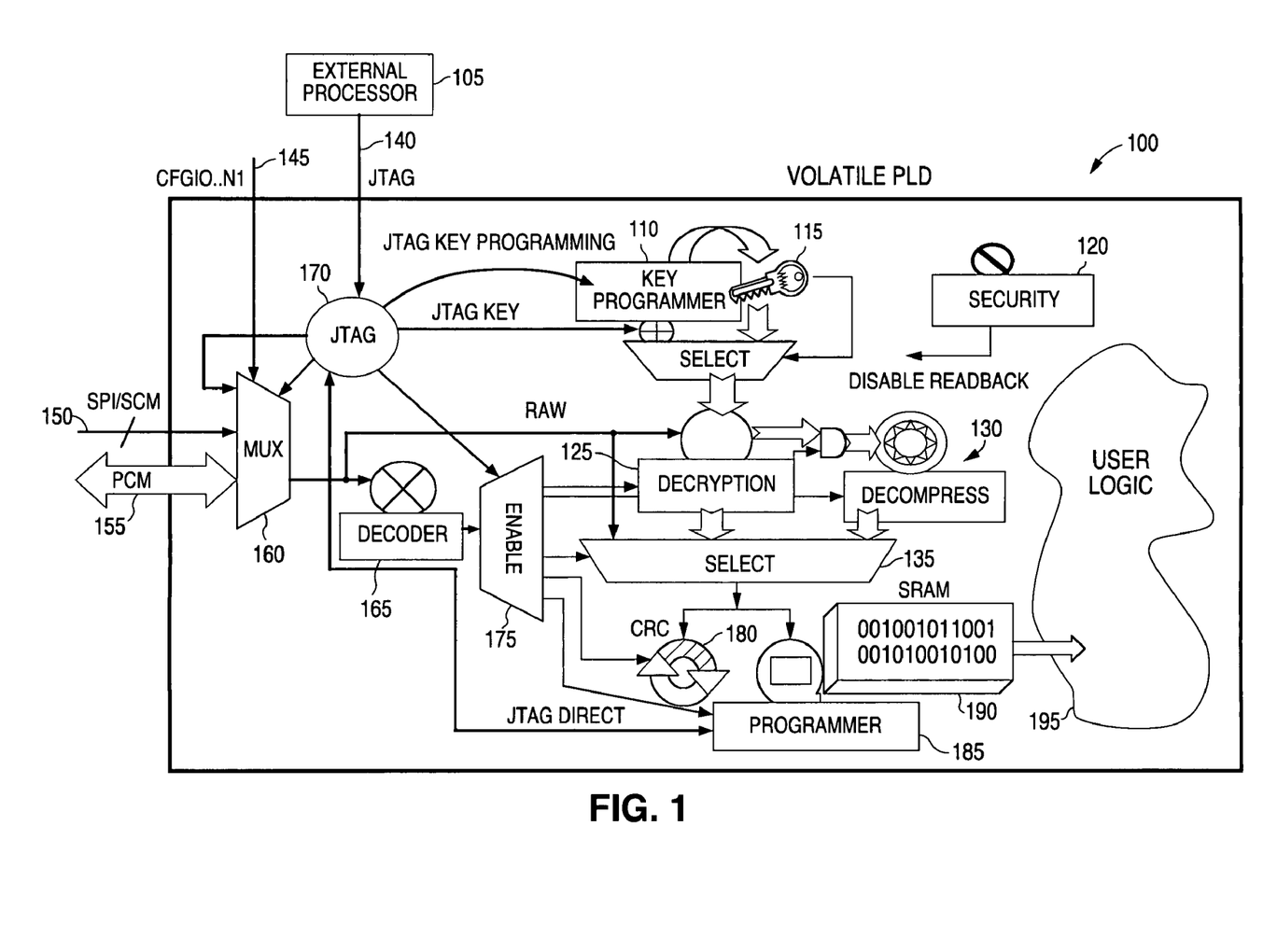
FIG. 1 illustrates a block diagram of a programmable logic device (PLD) in accordance with an embodiment of the present invention.

FIG. 1 illustrates a block diagram of a programmable logic device (PLD) 100 in accordance with an embodiment of the present invention. PLD 100 includes configuration memory 190 which may be implemented, for example, using volatile SRAM cells. Configuration memory 190 controls the operation of user logic 195 (e.g., LUT-based logic) which may implement various user-defined features of PLD 100 based on configuration data programmed into configuration memory 190 by an SRAM programmer 185.

PLD 100 may receive configuration data bitstreams from an external non-volatile memory (not shown in FIG. 1) or other device connected with PLD 100 through a JTAG port 140, a serial port 150, or a parallel port 155. It will be appreciated that JTAG port 140 may be implemented as a joint test action group (JTAG) employing standards such as Institute of Electrical and Electronics Engineers (IEEE) 1149.1 or 1532 standards. PLD 100 may also include dedicated JTAG circuitry 170 to support the operation of JTAG port 140. Serial port 150 may be implemented as a Serial Peripheral Interface (SPI) port 124 in accordance with a serial bus standard established by Motorola Corporation and supported in silicon products from various manufacturers. Parallel port 155 may be implemented in accordance with any appropriate parallel bus standard as may be desired in particular applications.

Configuration data bitstreams received through JTAG port 140, serial port 150, or parallel port 155 may be provided to PLD 100 in encrypted form. Accordingly, PLD 100 further includes a decryption engine 125 which may be used to decrypt configuration data through the use of a security key 115 (also referred to as a decipher key). In one embodiment, decryption engine 125 may be implemented to support one or more Advanced Encryption Standards (AES) (for example, 128-bit, 192-bit, and/or 256-bit encryption) as such encryption standards are understood by those skilled in the art.

Security key 115 may be programmed into various fuses of PLD 100 by a key programmer 110 as further described herein. Decryption engine 125 may use security key 115 to decrypt raw encrypted configuration data received by PLD 100 through JTAG port 140, serial port 150, or parallel port 155. As illustrated, security key 115 may be provided to key programmer 110 through JTAG port 140 and JTAG circuitry 170. PLD 100 may also be implemented with standard security features 120 to prevent readback through JTAG port 140, serial port 150, or parallel port 155 of configuration data currently programmed into configuration memory 190.

As illustrated in FIG. 1, an external processor 105 may be provided in communication with PLD 100 through JTAG port 140. As further described herein, external processor 105 may be provided with appropriate software for providing security key 115 to PLD 100 and for verifying data bit values stored in fuses of PLD 100.

Configuration data received through JTAG port 140, serial port 150, or parallel port 155 may be selectively provided to decryption engine 125 or a command decoder 165 through a multiplexer 160 under the control of select signals 145 (labeled CFG[0 . . . N]). In this regard, it will be appreciated that incoming configuration data may include various embedded commands which may be ascertained by command decoder 165 to provide appropriate control signals to other components of PLD 100 through a multiplexer 175.

Configuration data received through JTAG port 140, serial port 150, or parallel port 155 may also be provided to PLD 100 in compressed form. Accordingly, PLD 100 further includes a decompression engine 130. For example, decrypted configuration data processed by decryption engine 125 may, if in compressed form, be decompressed by a decompression engine 130 to obtain the configuration data to be programmed into configuration memory 190 of PLD 100.

As illustrated, unencrypted, uncompressed configuration data may be provided (e.g., via a multiplexer 135) to an error checking engine 180 and SRAM programmer 185. In one embodiment, error checking engine 180 may be configured to check incoming configuration data against cyclic redundancy codes (CRCs) embedded in the configuration data bitstream.

Figure 2:
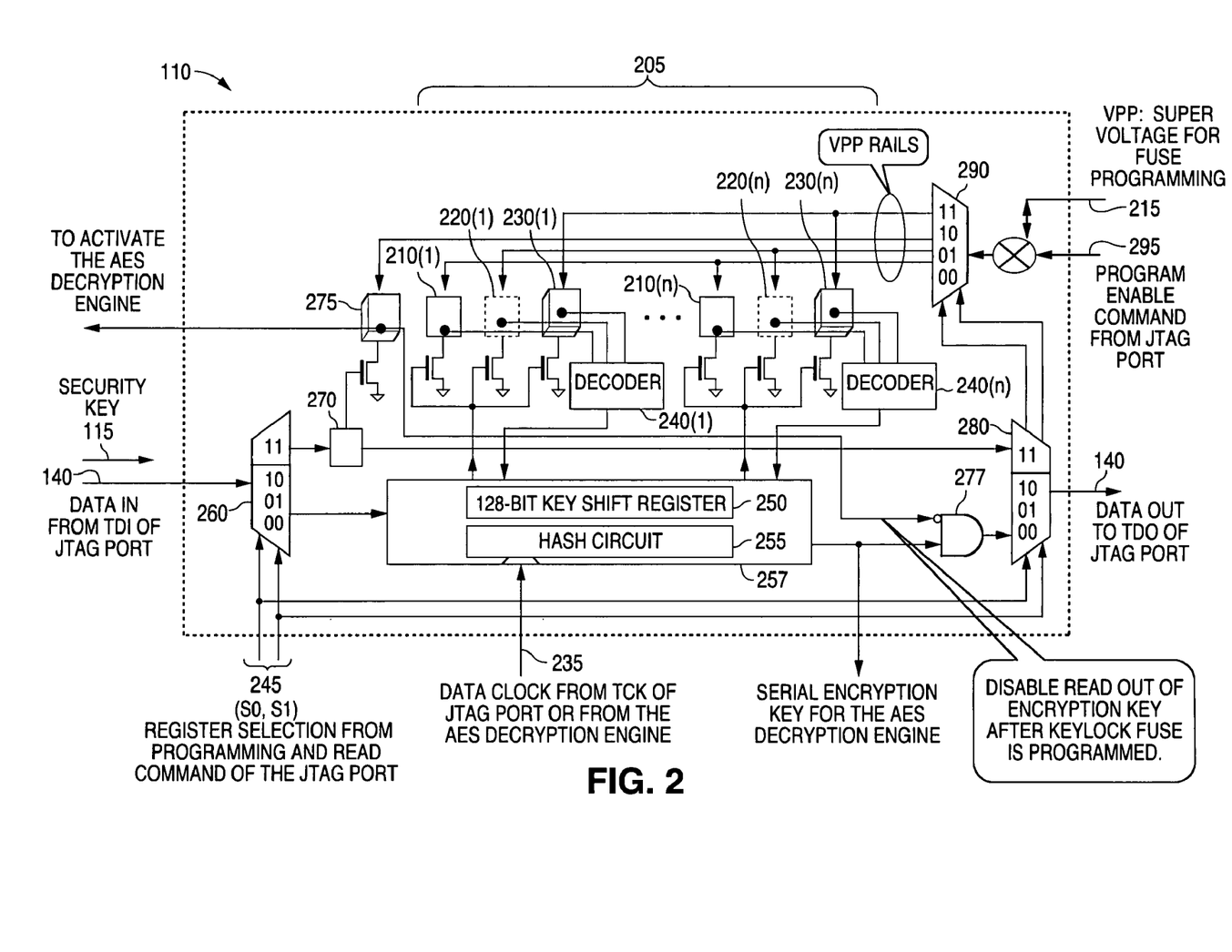
FIG. 2 illustrates a block diagram of circuitry for programming a security key in accordance with an embodiment of the present invention.

FIG. 2 illustrates a block diagram of key programmer 110 of PLD 100 in accordance with an embodiment of the present invention. Key programmer 110 includes a plurality of one time programmable (OTP) fuses 205 which may be used to store security key 115. In one embodiment, OTP fuses 205 may be implemented as poly fuses.

As will be appreciated by those skilled in the art, various manufacturing inconsistencies may cause individual OTP fuses 205 to exhibit underprogrammed or overprogrammed behavior. When such behavior occurs, incorrect data bit values may be stored in OTP fuses 205. However, in practice, the likelihood of such manufacturing inconsistencies occurring in two or more adjacent ones of OTP fuses 205 within PLD 100 is relatively unlikely. Therefore, in accordance with an aspect of the present invention, the effect of such manufacturing inconsistencies can be minimized by associating three or more of OTP fuses 205 with each data bit value of security key 115.

In this regard, OTP fuses 205 may be implemented to include security fuses 210, redundant fuses 220, and test fuses 230 arranged in a plurality of subsets (for example, n subsets as illustrated). Each subset of OTP fuses 205 may be associated with a single data bit value of security key 115 to permit a security key of n bits to be stored by OTP fuses 205. In one embodiment, individual fuses in each subset of OTP fuses 205 may be physically located in close proximity to each other (for example, adjacent to each other within key programmer 110). Although FIG. 2 illustrates n subsets each including three of OTP fuses 205, it will be appreciated that larger numbers of OTP fuses 205 may be used in each subset.

Key programmer 110 further includes a plurality of decoders 240, wherein each decoder 240 is associated with a subset of OTP fuses 205. Decoders 240 may be configured to provide a majority rule output value based on data bit values stored by individual subsets of OTP fuses 205. For example, in one embodiment, the logical function of each one of decoders 240 may be expressed by the following Table 1:

TABLE 1

| Decoder (240) | Key Fuse (210) | Redundant Fuse (220) | Test Fuse (230) |
|---|---|---|---|
| 0 | 0 | 0 | 0 |
| 0 | 0 | 0 | 1 |
| 0 | 0 | 1 | 0 |
| 1 | 0 | 1 | 1 |
| 0 | 1 | 0 | 0 |
| 1 | 1 | 0 | 1 |
| 1 | 1 | 1 | 0 |
| 1 | 1 | 1 | 1 |

As shown in Table 1 above, the output value provided by each decoder 240 will correspond to a 0 value when at least two of its associated OTP fuses 205 are storing a 0 value. Similarly, the output value provided by each decoder 240 will correspond to a 1 value when at least two of its associated OTP fuses 205 are storing a 1 value. Accordingly, in the event that an OTP fuse 205 (for example, a key fuse 210, a redundant fuse 220, or a test fuse 230) associated with a particular data bit value of security key 115 exhibits underprogramming or overprogramming, the actual data bit value of security key 115 may be provided by the associated decoder 240. It will be appreciated that decoders 240 may be implemented with any appropriate circuitry to provide the logical function set forth in Table 1 or other type of logical function to provide the correct data bit value.

Key programmer 110 further includes a shift register 250 and a hash circuit 255 which are collectively represented in FIG. 2 as a block 257. Shift register 250 may be implemented as an n-bit shift register configured to receive security key 115 from JTAG port 140. Hash circuit 255 may be implemented to perform hashing operations on security key 115 as further described herein. A clock signal 235 may be provided to block 257 to synchronize the operation of shift register 250 and hash circuit 255 with JTAG port 140 or decryption engine 125.

Security key 115 may be read into key programmer 110 through JTAG port 140 and JTAG circuitry 170 of FIG. 1. As illustrated in FIG. 2, security key 115 is received by a multiplexer 260 which may be controlled by select signals 245. Select signals 245 may be configured to pass security key 115 through multiplexer 260 to shift register 250. Data bit values stored in shift register 250 may be provided to a multiplexer 280 under the control of select signals 245 and passed to JTAG port 140.

Key programmer 110 further includes a multiplexer 290 under the control of select signals 245. As illustrated, multiplexer 290 may selectively provide a programming voltage 215 (labeled VPP) to security fuses 210, redundant fuses 220, test fuses 230, or a key lock fuse 275. Programming voltage 215 may be implemented as any appropriate voltage for programming OTP fuses 205. For example, in one embodiment, programming voltage 215 may be approximately 3.3 volts. As also illustrated, programming voltage 215 may be selectively provided to multiplexer 290 in response to a program enable signal 295.

Key programmer 110 further includes key lock fuse 275 which may be implemented as an OTP fuse for storing a data bit value of a key lock register 270. After security key 115 has been successfully stored in OTP fuses 205, key lock register 270 and key lock fuse 275 may be programmed in order to prevent further programming of OTP fuses 205 and to activate decryption engine 125. It will be appreciated that logic 277 may prevent the readout of data bit values stored in shift register 250 after key lock register 270 is programmed.

Figure 3:
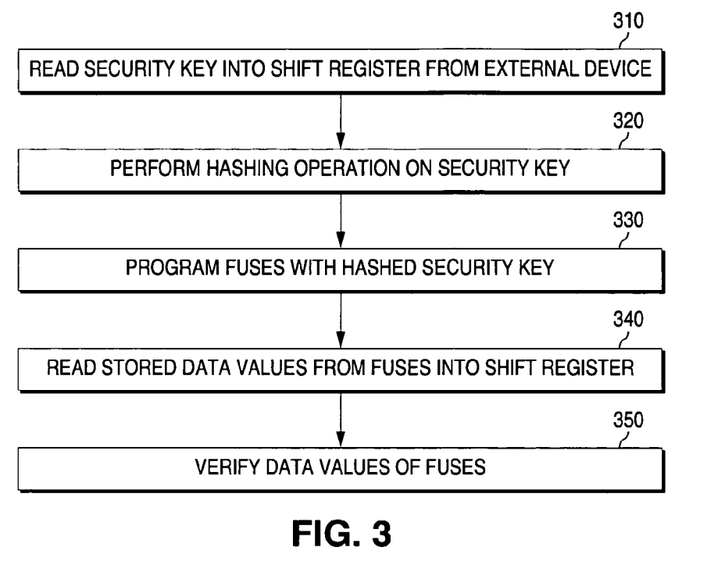
FIG. 3 illustrates a process of programming a security key in accordance with an embodiment of the present invention.

FIG. 3 illustrates a process of programming security key 115 into OTP fuses 205 in accordance with an embodiment of the present invention. In operation 310, security key 115 is initially read into shift register 250 from JTAG port 140 through multiplexer 260. For example, in one embodiment, security key 115 may be created by a developer and provided to PLD 100 from external processor 105 or another external device in communication with PLD 100 through JTAG port 140. Shift register 250 provides security key 115 to hash circuit 255 which performs a hashing operation on security key 115 to obtain a hashed version of security key 115 (operation 320). In this regard, hashing operation 320 may be performed in accordance with any appropriate hashing process as may be desired for particular applications of PLD 100.

In operation 330, the hashed version of security key 115 is read back into shift register 250 from hash circuit 255. Thereafter, shift register 250 attempts to program test fuses 230 with the hashed version of the security key 115. In this regard, it will be appreciated that programming voltage 215 may be provided to test fuses 230 through multiplexer 290 as previously discussed. In one embodiment, test fuses 230 may be programmed in a serial fashion.

In operation 340, shift register 250 reads the data bit values stored in test fuses 230 and passes them through logic 277 and multiplexer 280 to external processor 105 through JTAG port 140. External processor 105 may be provided with appropriate software for also performing the first hashing operation (i.e., the operation performed by hash circuit 255) on security key 115 and verifying that data bit values stored by test fuses 230 (i.e., data bit values passed back to external processor 105 from shift register 250) correspond to the hashed version of security key 115. Accordingly, in operation 350, external processor 105 verifies the data bit values read in operation 340 to determine whether they match the hashed version of security key 115.

The process of FIG. 3 may be repeated a second time for programming key fuses 210 and a third time for programming redundant fuses 220. Optionally, if verification operation 350 for the first two iterations of the process indicates that data bit values stored in test fuses 230 and key fuses 210 correspond to the hashed version of security key 115, then the third iteration of the process may be optionally omitted for redundant fuses 220. In this regard, it will be appreciated that if test fuses 230 and key fuses 210 are all correctly programmed with the hashed version of security key 115, then decoders 240 will provide such values when read by shift register 250, regardless of the values stored in redundant fuses 220.

Following the programming of OTP fuses 205, key lock register 270 and key lock fuse 275 may each be programmed to prevent subsequent readout of security key 115 from OTP fuses 205 or shift register 250. For example, it will be appreciated from FIG. 2 that if key lock fuse 275 exhibits a logical high value, logic 277 will only pass a logical low value through multiplexer 280, regardless of the data bit values passed by shift register 250.

Figure 4:
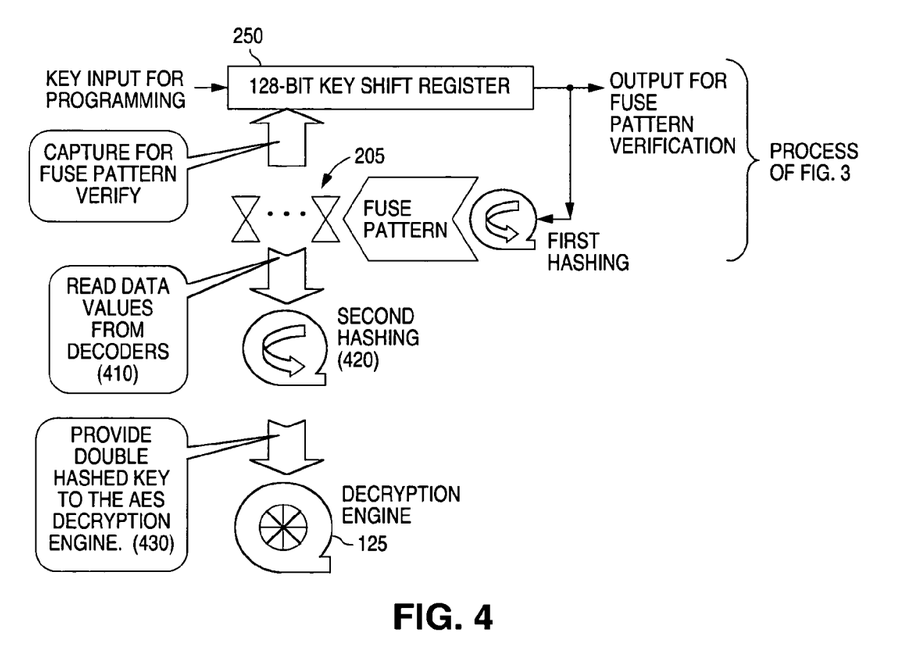
FIG. 4 illustrates additional processing performed on a security key in accordance with an embodiment of the present invention.

FIG. 4 illustrates additional processing performed on security key 115 in accordance with an embodiment of the present invention. As shown in FIG. 4, a hashed version of security key 115 is programmed into OTP fuses 205 in accordance with the process of FIG. 3 previously described herein. Thereafter, in order to decrypt an encrypted configuration data bitstream received by PLD 100, data bit values of OTP fuses 205 are read into shift register 250 from decoders 240 (operation 410). It will be appreciated that the data bit values read in operation 410 will correspond to the hashed version of security key 115 provided by operations 320 and 330 of FIG. 3. The data bit values read in operation 410 are then passed to hash circuit 255 which performs a further hashing operation to provide a second hashed version (i.e., a double hashed version) of security key 115 (operation 420). The second hashed version of security key 115 is then read back into shift register 250 which passes it on to decryption engine 125 as also illustrated in FIG. 4 (operation 430) and described further in reference to FIGS. 5A-B.

Figure 5A:
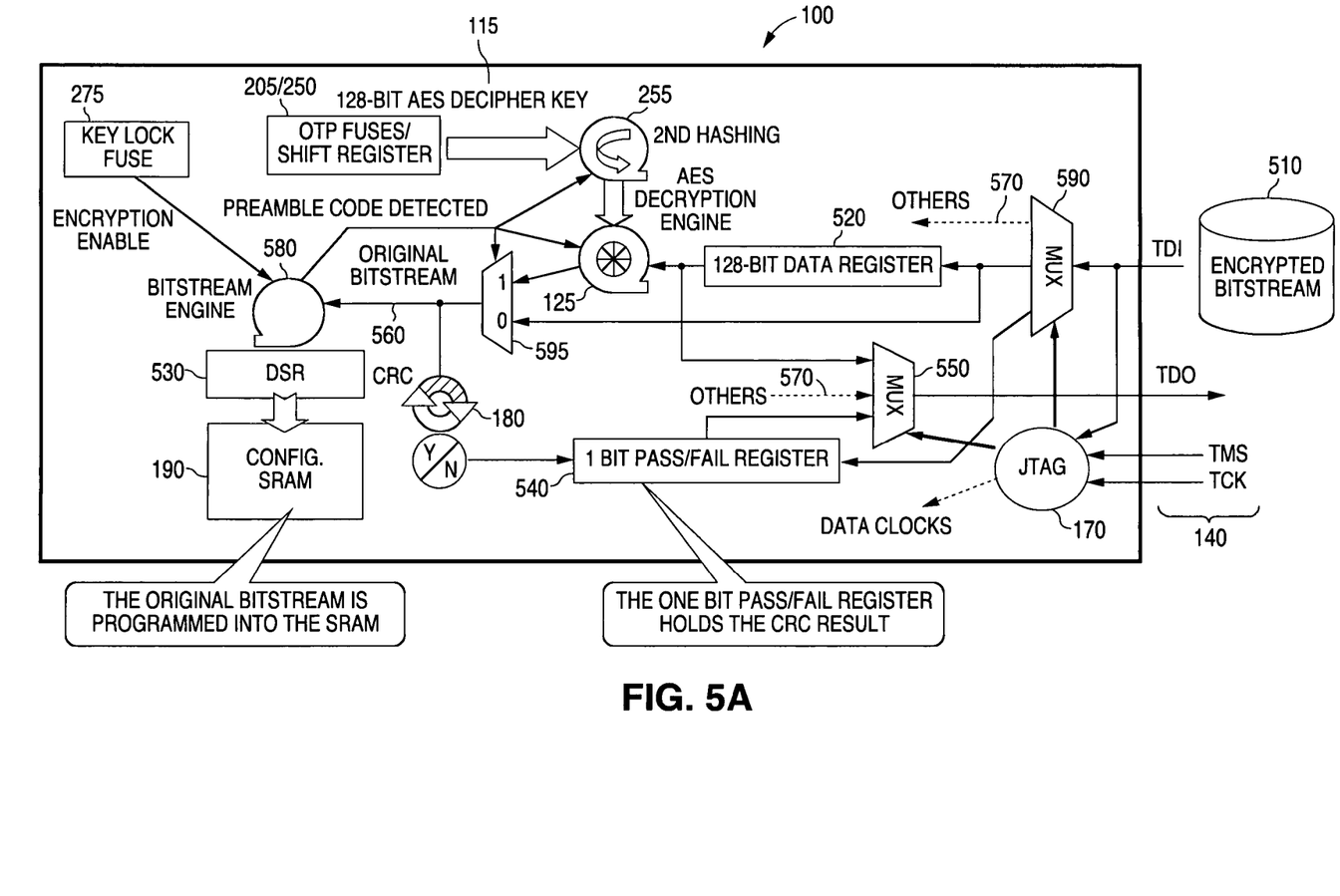
FIGS. 5A-B illustrate various components used for processing configuration data bitstreams in accordance with embodiments of the present invention.
Figure 5B:
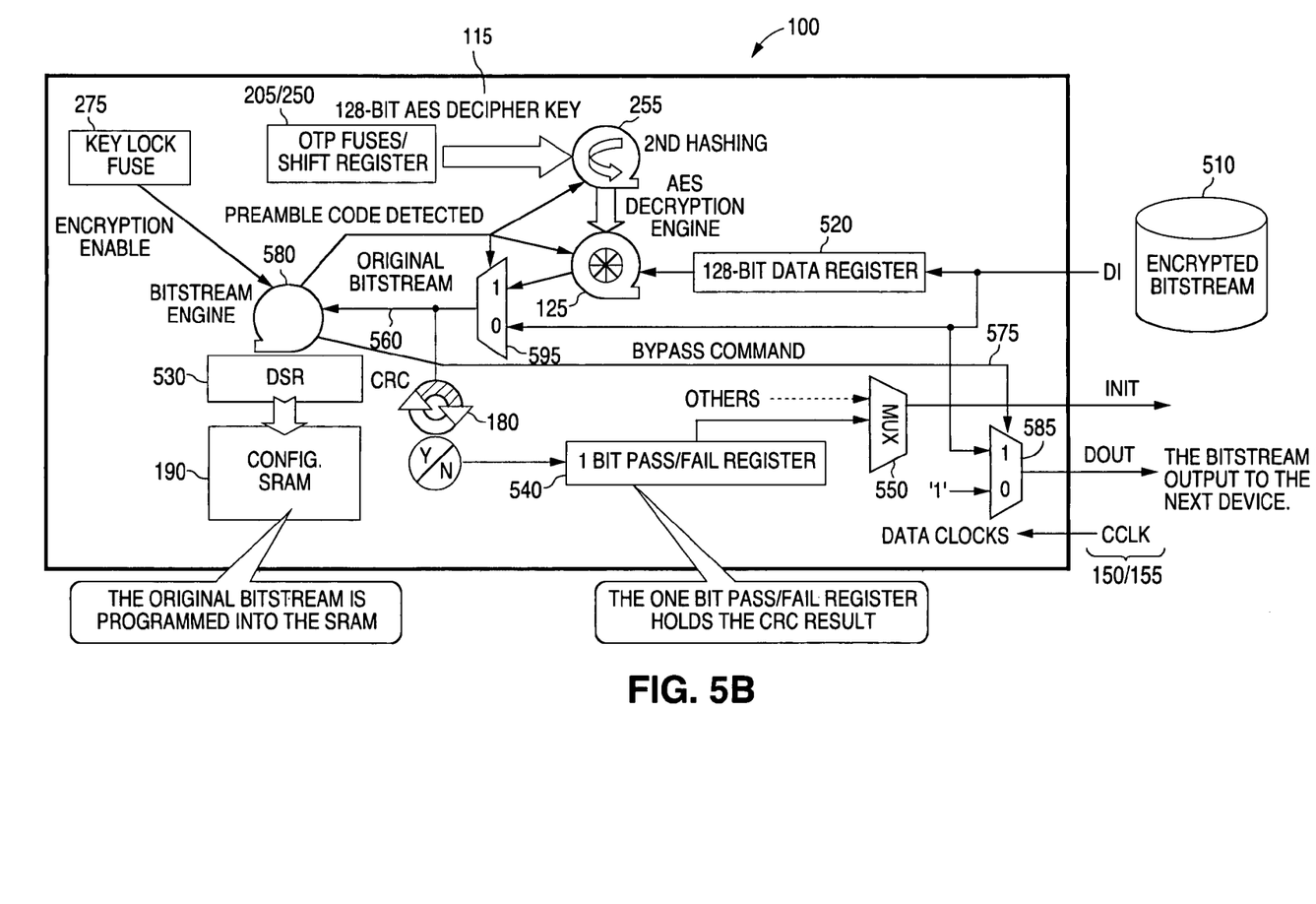

FIGS. 5A-B illustrate various components of PLD 100 which may be used for processing configuration data bitstreams in accordance with embodiments of the present invention. Referring to the embodiment of FIG. 5A, PLD 100 is illustrated as being implemented with JTAG port 140. An encrypted configuration data bitstream 510 which has been encrypted by the second hashed version of security key 115 is provided to JTAG port 140. Encrypted configuration data bitstream 510 may be stored, for example, in an external non-volatile memory in communication with PLD 100 through JTAG port 140.

Data received through JTAG port 140 (for example, encrypted configuration data bitstream 510, commands, or unencrypted configuration data) may be read into a register 520 of PLD 100 through a multiplexer 590 in 128-bit blocks, and passed to decryption engine 125. As illustrated, data may also be passed directly to a multiplexer 595.

Data received through JTAG port 140 may also be passed to various other components 570 (labeled "Others") of PLD 100 and/or out of JTAG port 140 (i.e., through a multiplexer 550) under the control of JTAG circuitry 170 to other devices as may be desired. In this regard, JTAG circuitry 170 may be configured to decode a JTAG bypass command received at a "TDI" pin of JTAG port 140. In response to the JTAG bypass command, JTAG circuitry 170 may provide appropriate select signals to multiplexers 550 and 590 to pass data received at TDI pin to a bypass register (i.e., implemented as one of components 570) and out a "TDO" pin of JTAG port 140 to be provided to another PLD or other device which may be connected with PLD 100. For example, in one embodiment, a plurality of PLDs may be connected with each other in a daisy chain fashion to permit configuration data bitstreams to be passed from an external memory through PLD 100 and on to a second PLD, as further described herein.

PLD 100 may also be provided with a bitstream engine 580 to facilitate the processing of data received through JTAG port 140. In operation, bitstream engine 580 may be configured to initially select a logical 0 input of multiplexer 595 in order to receive data provided at JTAG port 140. Bitstream engine 580 may also be configured to recognize various preamble codes associated with configuration data bitstreams. For example, in one embodiment, bitstream engine 580 may operate in a first mode to recognize a first preamble code associated with unencrypted configuration data bitstreams, and in a second mode to recognize a second preamble code associated with encrypted configuration data bitstreams.

If key lock fuse 275 is unprogrammed (i.e., security key 115 has not yet been programmed in OTP fuses 205), bitstream engine 580 may operate in the first mode. In this case, if bitstream engine 580 receives a first preamble code associated with an unencrypted configuration data bitstream, it may pass the unencrypted configuration data bitstream on to a data shift register 530 for programming into configuration memory 190 by SRAM programmer 185 (illustrated in FIG. 1).

If, however, key lock fuse 275 is programmed, bitstream engine 580 may operate in the second mode. Accordingly, if bitstream engine 580 receives a preamble code associated with an encrypted configuration data bitstream (e.g., encrypted configuration data bitstream 510), then bitstream engine 580 may select a logical 1 input of multiplexer 595 to receive decrypted data from decryption engine 125.

In this regard, the second hashed version of security key 115 may be read from OTP fuses 205 and passed from shift register 250 to decryption engine 125 in the manner previously described in relation to FIG. 4. Decryption engine 125 may process each 128-bit block 520 of encrypted configuration data bitstream 510 using the second hashed version of security key 115 to obtain an original configuration data bitstream 560 which is provided to bitstream engine 580 through multiplexer 595. Original configuration data bitstream 560 may then be passed on to data shift register 530 for programming into configuration memory 190 by SRAM programmer 185 (illustrated in FIG. 1).

Error checking engine 180 performs error checking on configuration data received through multiplexer 595 and programs a pass/fail register 540 with appropriate values corresponding to the status of errors. As illustrated, the value of pass/fail register 540 may be provided to JTAG port 140.

Referring now to the embodiment of FIG. 5B, PLD 100 is illustrated as being implemented with serial port 150. It will be appreciated that the embodiment of FIG. 5B may be implemented with parallel port 155 or a CPU port in addition to, or in place of, serial port 150.

The various components common to both FIGS. 5A-B may operate in the manner previously described with regard to FIG. 5A. However, as illustrated, FIG. 5B further includes a multiplexer 585 which may be implemented to pass data from a "DI" pin to a "Dout" pin of serial port 150. Such a configuration allows data received at DI pin to be passed to another PLD or other device which may be connected with PLD 100 as previously described in relation to FIG. 5A.

Also in the embodiment of FIG. 5B, bitstream engine 580 may be configured to recognize a serial bypass command which may be received through serial port 150. In this regard, decoder 165 (illustrated in FIG. 1) may be implemented as part of bitstream engine 580 to decode the serial bypass command. If bitstream engine 580 receives the serial bypass command, then bitstream engine 580 may assert a select signal 575 of multiplexer 585 to pass data from DI pin to Dout pin and on to a second PLD until the second PLD indicates that the data has been successfully received (e.g., by asserting a "DONE" pin of the second PLD.

Figure 6:
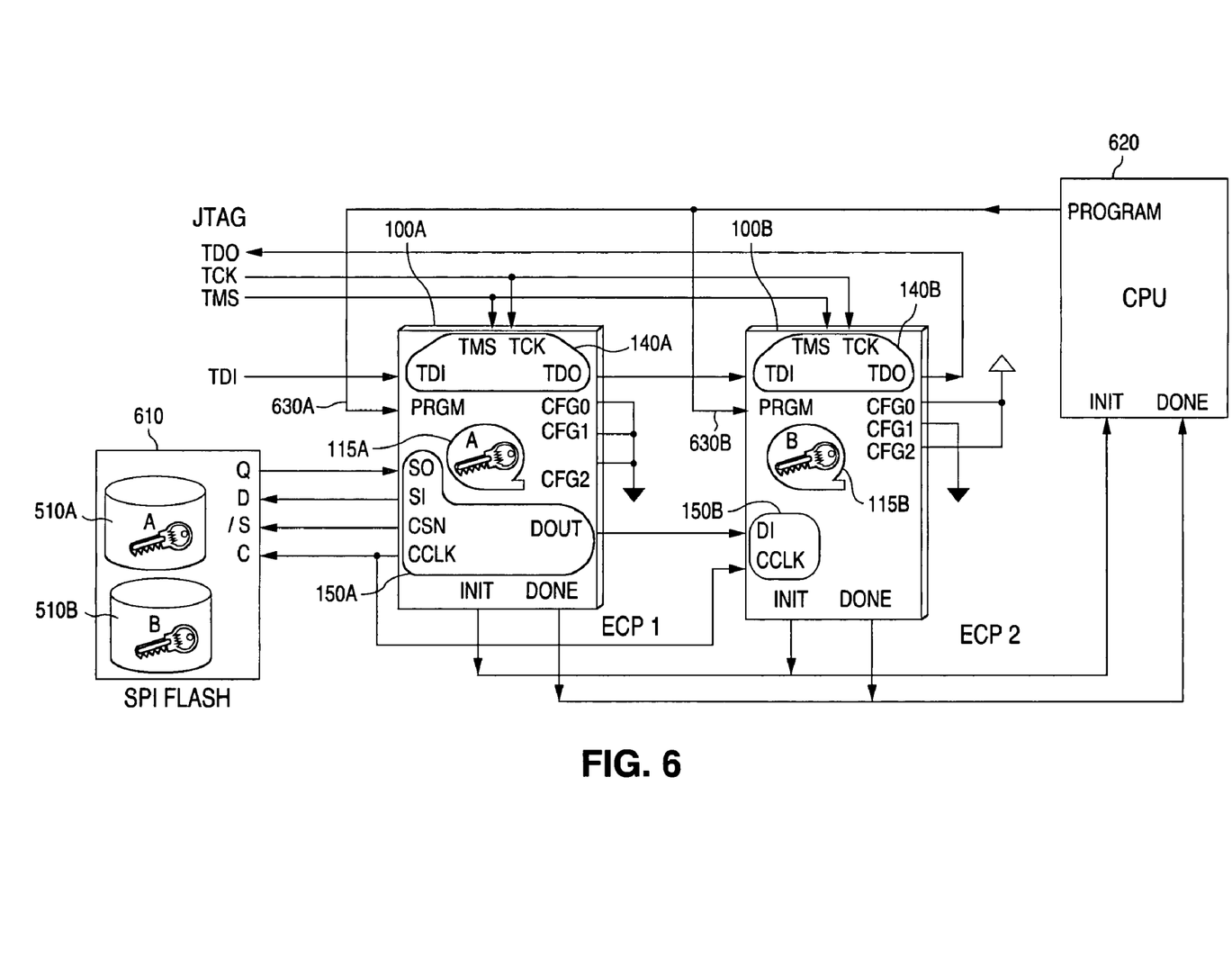
FIG. 6 illustrates a block diagram of a plurality of PLDs configured to decrypt configuration data bitstreams using separate security keys in accordance with an embodiment of the present invention.

FIG. 6 illustrates a block diagram of a plurality of PLDs 100A and 100B (labeled ECP 1 and ECP 2) configured to decrypt configuration data bitstreams using separate security keys 115A and 115B, respectively, in accordance with an embodiment of the present invention. It will be appreciated that each of PLDs 100A and 100B may be implemented in accordance with one or more embodiments of PLD 100 previously described herein. Similarly, each of security keys 115A and 115B may be implemented in accordance with one or more embodiments of security key 115 previously described herein.

FIG. 6 further illustrates a CPU 620 in communication with PLDs 100A and 100B to initiate loading of first and second encrypted configuration data bitstreams 510A and 510B upon toggling program pins 630A and 630B, respectively. PLDs 100A and 100B are provided with JTAG ports 140A and 140B to support programming of security keys 115A and 115B in OTP fuses of PLDs 100A and 100B, respectively, in the manner previously described herein. PLDs 100A and 100B are also provided with serial ports 150A and 150B to receive encrypted configuration data from external devices. In this regard, a non-volatile memory 610 (labeled SPI FLASH) is provided in communication with a serial port 150A of PLD 100A.

As illustrated, first and second encrypted configuration data bitstreams 510A and 510B, respectively, are stored in non-volatile memory 610. Each of first and second encrypted configuration data bitstreams 510A and 510B may be encrypted using a second hashed version of each of security keys 115A and 115B, respectively. First encrypted configuration data bitstream 510A may be loaded into PLD 100A through serial port 150A and decrypted by PLD 100A using security key 115A stored in OTP fuses of PLD 100A in the manner previously described herein. In addition, second encrypted configuration data bitstream 510B may be passed to PLD 100A through serial port 150A, passed on to PLD 100B through the daisy chain configuration of serial port 150A and serial port 150B, and decrypted by PLD 100B using security key 115B stored in OTP fuses of PLD 100B.

In view of the present disclosure, it will be appreciated that a PLD implemented in accordance with one or more of the various embodiments disclosed herein may support the programming and subsequent retrieval of security keys with high confidence. In particular, by storing each data bit value of the security key in a plurality of associated OTP fuses and reading back the bit value stored by a majority of the associated OTP fuses, the effects of overprogramming or underprogramming may be reduced. Advantageously, by storing a first hashed version of the security key and performing decryption using a second hashed version of the security key, the ability of third parties to readily discern the security key through inspection of the OTP fuses can also be impaired.

Embodiments described above illustrate but do not limit the invention. It should also be understood that numerous modifications and variations are possible in accordance with the principles of the present invention. Accordingly, the scope of the invention is defined only by the following claims.

We claim:

1. A programmable logic device (PLD) comprising:
a volatile configuration memory adapted to be programmed with configuration data to determine user-defined features of the PLD;
a plurality of programmable fuses, each fuse adapted to store a bit;
a circuit adapted to program the fuses with a security key comprising a plurality of data bit values;
a plurality of decoders, each decoder associated with a subset of at least three fuses and adapted to retrieve a single data bit value of the security key by decoding multiple bits stored within the associated subset of fuses, wherein the decoder is adapted to decode the multiple bits by providing the bit value stored by the majority of the fuses within the subset as the single data bit value; and
a decryption engine adapted to decrypt an encrypted configuration data bitstream using the retrieved security key.

2. The PLD of claim 1, wherein the fuses are one-time-programmable (OTP) fuses.

3. The PLD of claim 1, wherein the security key is not discernable by visual inspection of the fuses.

4. The PLD of claim 1, further comprising a hash circuit adapted to hash the retrieved security key to obtain a hashed version of the retrieved security key, wherein the decryption engine is adapted to use the hashed version of the retrieved security key.

5. The PLD of claim 1, further comprising:
a data port adapted to receive the security key from a device external to the PLD; and
a hash circuit adapted to hash the received security key to obtain a hashed version of the received security key, wherein the hashed version of the received security key is used to program the fuses.

6. The PLD of claim 1, further comprising a key lock circuit adapted to prevent readback of the fuses to a device external to the PLD.

7. The PLD of claim 1, wherein the fuses comprise:
a plurality of test fuses;
a plurality of key fuses; and
a plurality of redundant fuses,
wherein the associated subset of fuses includes a test fuse, a key fuse, and a redundant fuse.

8. The PLD of claim 1, wherein the fuses within the subset are physically located in close proximity to teach other within the PLD.

9. A programmable logic device (PLD) comprising: a volatile configuration memory adapted to be programmed with configuration data to determine user-defined features of the PLD; a plurality of programmable fuses, each fuse adapted to store a bit; a circuit adapted to program the fuses with a security key comprising a plurality of data bit values; a hash circuit adapted to hash the security key stored in the plurality of fuses to obtain a hashed version of the security key; and a decryption engine adapted to use the hashed version of the security key to decrypt an encrypted configuration data bitstream into configuration data for programming the volatile configuration memory; a plurality of decoders, each decoder associated with a subset of at least three fuses and adapted to retrieve a single data bit value of the security key by decoding the multiple bits stored within the associated subset of fuses.

10. The PLD of claim 9, wherein the fuses within the subset are physically located in close proximity to teach other within the PLD.

11. A programmable logic device (PLD) comprising: a volatile configuration memory adapted to be programmed with configuration data to determine user-defined features of the PLD; a plurality of programmable fuses, each fuse adapted to store a bit; a circuit adapted to program the fuses with a security key comprising a plurality of data bit values; a decryption engine adapted to use the security key to decrypt an encrypted configuration data bitstream into configuration data for programming the volatile configuration memory; and a key lock circuit adapted to prevent readback of the fuses to a device external to the PLD; a plurality of decoders, each decoder associated with a subset of at least three fuses and adapted to retrieve a single data bit value of the security key by decoding the multiple bits stored within the associated subset of fuses.

12. The PLD of claim 11, wherein the fuses within the subset are physically located in close proximity to teach other within the PLD.

13. The PLD of claim 11, wherein the key lock circuit includes a key lock register and a key lock fuse.

* * * * *